US009668285B2

(12) United States Patent
Zhang et al.

(10) Patent No.: US 9,668,285 B2
(45) Date of Patent: May 30, 2017

(54) METHODS AND APPARATUS FOR STANDALONE LTE RAN USING UNLICENSED FREQUENCY BAND

(71) Applicant: Telefonaktiebolaget L M Ericsson (publ), Stockholm (SE)

(72) Inventors: Zhan Zhang, Beijing (CN); Gen Li, Beijing (CN); Gunnar Mildh, Sollentuna (SE); Jinhua Liu, Beijing (CN); Dinand Roeland, Sollentuna (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 242 days.

(21) Appl. No.: 14/399,141

(22) PCT Filed: Oct. 10, 2014

(86) PCT No.: PCT/SE2014/051198
§ 371 (c)(1),
(2) Date: Nov. 5, 2014

(87) PCT Pub. No.: WO2016/056966
PCT Pub. Date: Apr. 14, 2016

(65) Prior Publication Data
US 2016/0105915 A1    Apr. 14, 2016

(51) Int. Cl.
*H04W 76/02* (2009.01)
*H04W 16/14* (2009.01)
(Continued)

(52) U.S. Cl.
CPC .......... *H04W 76/02* (2013.01); *H04W 16/14* (2013.01); *H04W 48/12* (2013.01); *H04W 8/18* (2013.01);
(Continued)

(58) Field of Classification Search
CPC .......... H04L 65/1093; H04L 65/1069; H04W 76/021; H04W 76/02; H04W 16/14;
(Continued)

(56) References Cited

U.S. PATENT DOCUMENTS

| 2003/0076803 | A1* | 4/2003 | Chuah | ............... H04W 36/10 370/338 |
| 2012/0044866 | A1* | 2/2012 | Lu | ..................... H04L 12/5691 370/328 |
| 2012/0157095 | A1 | 6/2012 | Fodor et al. | |

FOREIGN PATENT DOCUMENTS

WO   WO 2012/085829 A1   6/2012

OTHER PUBLICATIONS

3GPP, Technical Specification, "3rd Generation Partnership Project; Technical Specification Group Services and System Aspects; General Packet Radio Service (GPRS) enhancements for Evolved Universal Terrestrial Radio Access Network (E-UTRAN) access (Release 12)", 3GPP TS 23.401 V12.6.0 (Sep. 2014), 306 pages.
(Continued)

*Primary Examiner* — Kan Yuen
*Assistant Examiner* — Richard Chang
(74) *Attorney, Agent, or Firm* — Sage Patent Group

(57) ABSTRACT

The present invention relates to methods and apparatus for enabling an establishment of a connection between a wireless device and a core network via an access node of a standalone LTE RAN using an unlicensed frequency band. The method performed by the access node comprises transmitting a broadcast message in a cell served by the access node. The message indicates that the access node supports connectivity to at least one core network associated with another RAN than the standalone LTE RAN. The method also comprises receiving a request to attach from a wireless device in the cell, for establishing a secure connection for user data between the wireless device and a target core
(Continued)

network via the access node. The method further comprises transmitting a request to a target core network node to establish the secure connection.

22 Claims, 10 Drawing Sheets

(51) Int. Cl.
*H04W 48/12* (2009.01)
*H04W 84/04* (2009.01)
*H04W 8/18* (2009.01)
*H04W 48/18* (2009.01)
*H04W 60/00* (2009.01)

(52) U.S. Cl.
CPC ............ *H04W 48/18* (2013.01); *H04W 60/00* (2013.01); *H04W 84/042* (2013.01)

(58) Field of Classification Search
CPC ..... H04W 84/042; H04W 48/12; H04W 8/18; H04W 48/18; H04W 60/00

USPC ........................................................ 370/328

See application file for complete search history.

(56) References Cited

OTHER PUBLICATIONS

3GPP, Technical Specification, "3rd Generation Partnership Project; Technical Specification Group Services and System Aspects; Architecture enhancements for non-3GPP accesses (Release 12)", 3GPP TS 23.402 V12.6.0 (Sep. 2014), 288 pp.

Ratasuk et al., "License-Exempt LTE Deployment in Heterogeneous Network", *2012 International Symposium on Wireless Communication Systems (ISWCS)*, Paris, France, Aug. 28-31, 2012, pp. 246-250.

International Search Report, PCT Application No. PCT/SE2014/051198, Jun. 11, 2015.

Written Opinion of the International Searching Authority, PCT Application No. PCT/SE2014/051198, Jun. 11, 2015.

* cited by examiner

METHODS AND APPARATUS FOR STANDALONE LTE RAN USING UNLICENSED FREQUENCY BAND

CROSS REFERENCE TO RELATED APPLICATION

This application is a 35 U.S.C. §371 national stage application of PCT International Application No. PCT/SE2014/051198, filed on 10 Oct. 2014, the disclosure and content of which is incorporated by reference herein in its entirety.

TECHNICAL FIELD

The disclosure relates to standalone Long Term Evolution (LTE) Radio Access Network (RAN) using unlicensed frequencies, and more specifically to methods and apparatus for enabling an establishment of a connection between a wireless device and a core network via an access node of a standalone LTE RAN using an unlicensed frequency band.

BACKGROUND

Long Term Evolution (LTE) is the fourth-generation mobile communication technologies standard developed within the $3^{rd}$ Generation Partnership Project (3GPP) to improve the Universal Mobile Telecommunication System (UMTS) standard to cope with future requirements in terms of improved services such as higher data rates, improved efficiency, and lowered costs. The Universal Terrestrial Radio Access Network (UTRAN) is the Radio Access Network (RAN) of a UMTS and Evolved UTRAN (E-UTRAN) is the RAN of an LTE system. In an E-UTRAN, a User Equipment (UE) is wirelessly connected to a Radio Base Station (RBS) commonly referred to as an evolved NodeB (eNodeB or eNB) in LTE. An RBS is a general term for a radio network node capable of transmitting radio signals to a UE and receiving signals transmitted by a UE.

FIG. 1 illustrates a conventional RAN in an LTE system. An eNodeB 101 serves a UE 103 located within the eNodeB's geographical area of service also called a cell. The eNodeB 101 manages the radio resources in its cell and is directly connected to a Core Network (CN) node 105.

Conventionally, an LTE RAN is operated by an operator over a licensed frequency band. Lately, it has been proposed to run LTE RAN also over unlicensed frequency bands by aggregating licensed and unlicensed frequency bands. The use of the unlicensed frequency band is made possible by applying a listen-before-talk (LBT) mechanism, which means that a subframe can be scheduled for data transmission on a radio channel only when the unlicensed frequency band carrier is determined to be idle. In this way, a fair competition is allowed between LTE and other wireless radio systems such as WiFi, with regards to the use of the unlicensed frequency band. For the LTE RAN, the solution implies that a primary carrier is configured on the licensed frequency band while the unlicensed frequency band shall only be used for a secondary carrier. This can be referred to as licensed carrier assisted LTE-Unlicensed (LTE-U), or License Assisted Access LAA. The object of such a carrier aggregation solution is to make it possible for an operator to make use of an unlicensed frequency band having relatively low load and thereby increase the utilization of such an unlicensed frequency band. It may be expected that the licensed carrier assisted LTE-U system is mainly designed for LTE operators as a licensed carrier is mandatory.

A Home eNodeB (HeNB), also referred to as a Femto base station, has already been standardized in 3GPP. FIG. 2a illustrates a typical scenario of a HeNB deployment, and FIG. 2b represents an LTE network structure used with the HeNB, in which a HeNB gateway (HeNB GW) and a HeNB management system are introduced into the operator's network. Some limitations related to the HeNB are the following:

HeNB runs in a licensed frequency band. This means that it is controlled by the operator that owns the frequency band and mainly serves subscribers of this operator.

HeNB is not cost-efficient with regards to charging from an end-user perspective. At home or in office, a subscriber may like to select a fixed broadband operator to achieve a data service as cost efficient as possible.

There are solutions to share HeNB between multiple operators, e.g. disclosed in WO2012/085829. According to one method, the HeNB tries to setup an internet security (IPsec) protocol tunnel when the HeNB receives the Public Land Mobile Network (PLMN) identity from the UE. The IPsec protocol tunnel is associated with the S1 and Iu interfaces that are associated with the HeNB GW of the PLMN. The HeNB then communicates between the UE and the PLMN via the IPsec protocol tunnel. However, it is still a fact that the HeNB may only be deployed by an operator, or by other operators with the permission from the corresponding operator. Furthermore, the solution for HeNB sharing between multiple operators is determined by these operators only and not by the subscribers.

Due to the limitations of the HeNB, the market situation of the HeNB is weak compared to the WiFi solution which has grown popular and therefore dominate the wireless local access market. With a WiFi solution for local access, a subscribed fixed broadband access is used for the connection. Advantages of WiFi are that a WiFi solution may be customized, the data cost may be low, and the manufacturing price may be low.

A standalone LTE RAN using an unlicensed frequency band only, i.e. without licensed carrier assistance, may be a promising future solution. An advantage of a standalone LTE RAN is that it makes it possible for anyone to deploy such a network and not only LTE operators. Other parties such as enterprises, building owners, and individuals may thus deploy an LTE RAN access point, similar to what is possible with a WiFi network today. Furthermore, a standalone LTE RAN using only an unlicensed frequency band may provide even better flexibility and user experience compared to WiFi.

SUMMARY

It is an object to address some of the problems outlined above, and to provide a solution for standalone LTE RAN using an unlicensed frequency band. This object and others are achieved by the method and the apparatus according to the independent claims, and by the embodiments according to the dependent claims.

In accordance with a first aspect, a method for enabling an establishment of a connection between a wireless device and a core network via an access node of a standalone LTE RAN using an unlicensed frequency band is provided. The method is performed by the access node and comprises transmitting a broadcast message in a cell served by the access node. The message indicates that the access node supports connectivity to at least one core network associated with another RAN than the standalone LTE RAN. The method also comprises receiving a request to attach from a wireless device in the cell, for establishing a secure connection for user data between the wireless device and a target core network via the access node. The method further comprises transmitting a request to a target core network node to establish the secure connection.

In accordance with a second aspect, a method for enabling an establishment of a connection between a wireless device and a core network via an access node of a standalone LTE RAN using an unlicensed frequency band is provided. The method is performed by the wireless device and comprises receiving a broadcast message in a cell served by the access node. The message indicates that the access node supports connectivity to at least one core network associated with another RAN than the standalone LTE RAN. The method also comprises transmitting a request to attach to the access node based on the received broadcast message, for establishing a secure connection for user data between the wireless device and a target core network via the access node.

In accordance with a third aspect, an access node of a standalone LTE RAN using an unlicensed frequency band is provided. The access node is configured to enable an establishment of a connection between a wireless device and a core network via the access node. The access node is further configured to transmit a broadcast message in a cell served by the access node. The message indicates that the access node supports connectivity to at least one core network associated with another RAN than the standalone LTE RAN. The access node is also configured to receive a request to attach from a wireless device in the cell, for establishing a secure connection for user data between the wireless device and a target core network via the access node. The access node is further configured to transmit a request to a target core network node to establish the secure connection.

In accordance with a fourth aspect, a wireless device configured to enable an establishment of a connection between the wireless device and a core network via an access node of a standalone LTE RAN using an unlicensed frequency band is provided. The wireless device is further configured to receive a broadcast message in a cell served by the access node. The message indicates that the access node supports connectivity to at least one core network associated with another RAN than the standalone LTE RAN. The wireless device is also configured to transmit a request to attach to the access node based on the received broadcast message, for establishing a secure connection for user data between the wireless device and a target core network via the access node.

An advantage of embodiments is that the standalone LTE RAN using unlicensed frequency band can be built by other parties than LTE operators and can provide coverage for any PLMN network deployed by an operator, thereby providing an alternative to WiFi access nodes Another advantage of embodiments is that the standalone LTE RAN can conditionally select target core network for the UE connection according to preferred criteria given by the subscriber.

A further advantage of embodiments is that the standalone LTE RAN provide functionality such as scheduling and mobility support of the LTE technology.

Other objects, advantages and features of embodiments will be explained in the following detailed description when considered in conjunction with the accompanying drawings and claims.

BRIEF DESCRIPTION OF THE DRAWINGS

FIGS. 7b and 7c illustrate possible user plane and control plane protocol stacks respectively for the scenario in FIG. 7a.

DETAILED DESCRIPTION

Figure 1:
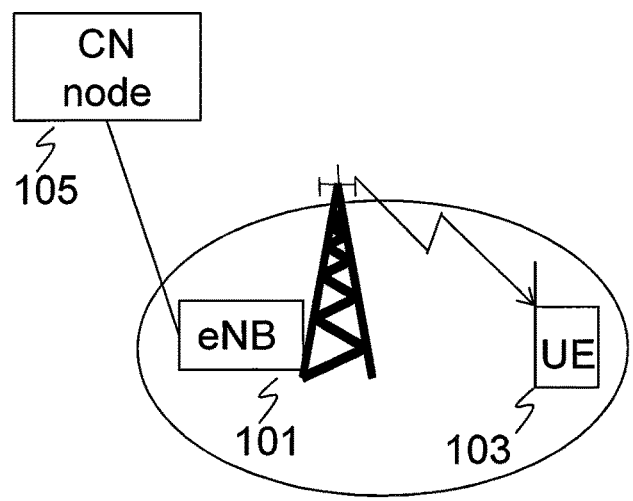
FIG. 1 is a schematic illustration of an LTE RAN according to prior art

In the following, different aspects will be described in more detail with references to certain embodiments and to accompanying drawings. For purposes of explanation and not limitation, specific details are set forth, such as particular scenarios and techniques, in order to provide a thorough understanding of the different embodiments. However, other embodiments that depart from these specific details may also exist.

Embodiments are described in a non-limiting general context in relation to an example scenario in a standalone LTE RAN, where the access node or access point is an eNodeB serving a cell in which a UE requests access. However, the access node may be any type of LTE access node and the UE in the cell may be any type of wireless device such as a mobile terminal or a portable computer. Although the embodiments are described in the LTE environment, they could be extended for other future standalone wireless communication systems over unlicensed frequencies.

In embodiments of the invention, a solution for a standalone LTE RAN that may be deployed by any parties other than operators is provided, where a higher layer solution enables establishment of a secure connection between the UE and networks including other PLMNs than the UEs home PLMN and fixed broadband networks.

Embodiments of the invention thus realize standalone LTE RAN sharing with any operator's PLMN or cable network via the secure connection setup according to pre-defined protocols. When the connection setup is successful, a standalone LTE RAN eNodeB can provide end user connectivity between the subscriber of the UE and the operator's network.

From a high level point of view such types of connections can be seen as inter-network roaming. However, the solution does not require any roaming agreement between the standalone LTE RAN owner and the operator of the target network. Instead the standalone LTE RAN connectivity is controlled by the end-user and the standalone LTE RAN, similar to access to a WiFi network. This is a more practical solution than a roaming solution which would require contracts to be setup between every standalone LTE RAN and operator.

The following features are part of embodiments of the invention, and are further described in the below sections A-C:

A. Special PLMN identity assignment for standalone LTE RAN: A standalone LTE RAN can be assigned with one or more special PLMN identities, with the purpose to indicate to UEs that the standalone LTE RAN eNodeB can provide connection to other PLMNs or fixed networks.

B. Dynamic session establishment with operator's network: A UE, which detects the special PLMN identity (see A above) can access the standalone LTE RAN eNodeB to connect to a target network, thus triggering a tentative connection establishment with the associated target core network.

C. Smart network selection for service provisioning: The standalone LTE RAN may provide smart network selection for providing the requested service to a UE based e.g. on the traffic type of the service.

A. Special PLMN Identity Assignment for Standalone LTE RAN

According to embodiments, all standalone LTE RANs can be assigned with one or more special PLMN identities, e.g. PLMN X. The special PLMN identity may be randomly selected from a predefined special range of one or more PLMN identities dedicated for standalone LTE RANs. The purpose of the special PLMN identities is to indicate that the standalone LTE RAN can provide connection to other PLMNs or fixed networks. These special PLMN identities may be reserved by 3GPP. The standalone LTE RAN eNodeB may select which PLMN identity within this range to use, either randomly or using some smart selection algorithm. The smart selection algorithm may e.g. consider which PLMN identities that are already used in the neighborhood.

A UE which detects the special PLMN identity may determine that there is good standalone LTE RAN coverage, and may initiate the connection to for example its own operator's network or the home PLMN through the standalone LTE RAN.

The standalone LTE RAN eNodeB may in embodiments transmit an explicit indication in a serving cell that it supports connectivity to core networks associated with other RANs than the standalone LTE RAN. Either broadcast or dedicated signaling may be used for the transmission of the indication. A UE may use the indication to decide if it shall try to attach to the standalone LTE RAN eNodeB or not.

B. Dynamic Session Establishment with Operator's Network

According to embodiments, a UE which detects the indication in the form of a special PLMN identity (see section A above) can access the standalone LTE RAN eNodeB and send a request to attach to the LTE RAN eNodeB.

In the request, the UE may in one embodiment include a desired or target network to connect to. The target network may e.g. be indicated by a PLMN identity of the target network. The standalone LTE RAN may then trigger a connection establishment between the UE and the target core network associated with the target network indicated by the UE in the request to attach. The establishment of the connection could involve performing a DNS lookup of the target PLMN identity to retrieve the IP address of the target network, e.g. the IP address of a security GW in the target core network.

In another embodiment, no target network is indicated by the UE in the request to attach. The standalone LTE RAN eNodeB may then trigger a session establishment to the core network of the home PLMN of the UE.

In embodiments, a method of probing based on specific roaming agreement negotiation between the standalone LTE RAN and the target network can be utilized. A standalone LTE RAN eNodeB may send usable candidate roaming agreements to the gateway of the target network. If the target network responds with an acceptance of one of the usable candidate roaming agreements, a roaming agreement is concluded between the standalone LTE RAN and the target network.

According to embodiments, additional security mechanisms may be applied for protecting the end-user of the UE. The reason for applying additional security is that the standalone LTE RAN eNodeB may not be owned by the home operator of the UE and may therefore be assumed to be less secure than a trusted operator owned eNodeB.

The following additional security mechanisms may be considered:

Non-access stratum (NAS) is a functional layer in the LTE protocol stacks between the core network and the user equipment. This layer is e.g. used to manage the establishment of communication sessions. One of the additional security mechanisms is to verify that it is the correct UE that is accessing the standalone LTE RAN eNodeB. This may prevent malicious standalone LTE RAN from masquerading as a specific UE. The solution for this may be based on an extension of the current NAS security, e.g. by performing additional security hand-shaking, or echoing back eNodeB information on the NAS level, making it possible to detect if any information is modified, or replayed in some other context.

Solutions to terminate user plane security or encryption in the home operator network. In this solution the user plane encryption (UPenc) key used in LTE would never be sent to the eNodeB. Instead encryption is established between the UE and the home operator network, thus preventing man in the middle attacks by establishing a secure tunnel.

Figure 7A:
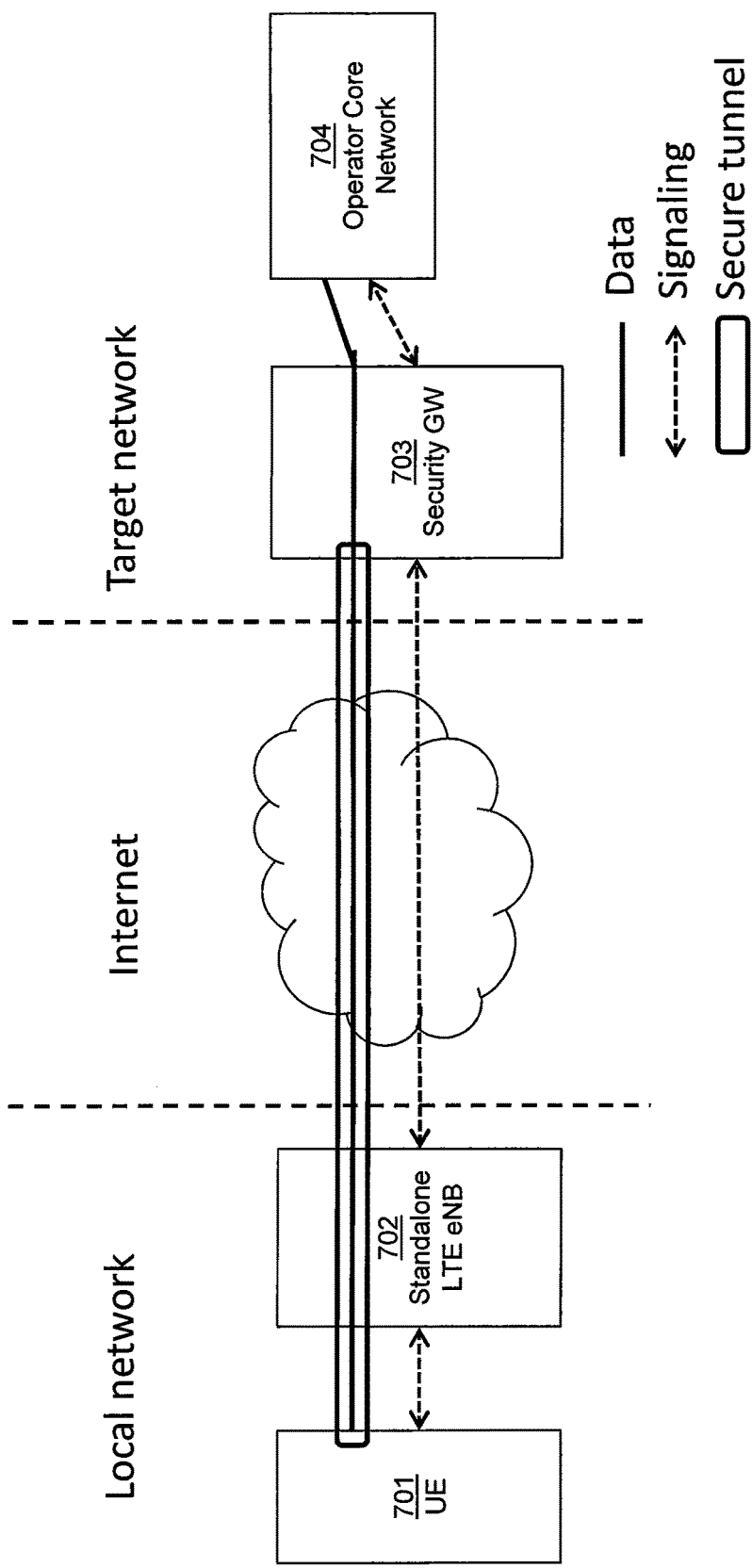
FIG. 7a is a block diagram schematically illustrating an established communication session between a UE and a target operator core network via a standalone LTE RAN eNodeB.

FIG. 7a is a block diagram schematically illustrating an established communication session between a UE 701 and a target operator core network 704 via a standalone LTE RAN eNodeB 702. A secure tunnel is set up from the UE to a security GW 703 in the target network through internet, thus preventing man in the middle attacks. The separate security GW 703 may be collapsed into the operator core network node 704. Tunneling protocols which could be based on any available tunneling protocols such as Generic Routing Encapsulation (GRE) are used between the LTE RAN eNodeB 702 and the security GW 703, and between the security GW 703 and the core network node 704. Furthermore, a new signaling protocol is introduced to handle the initial connection setup between eNodeB and target core network. This protocol could re-use some functionality from S1-Application Protocol (AP), which is the protocol between E-YTRAN and LTE core network. However the protocol used here has novel aspects with regards to S1-AP related to the setting up the connection only at the time when the UE wants to connect.

Figure 7B:
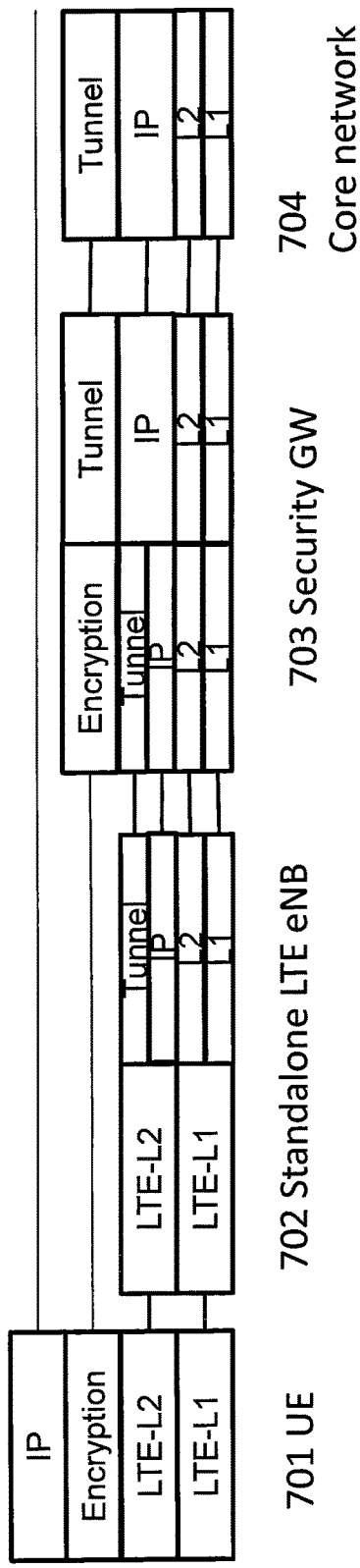
Figure 7C:
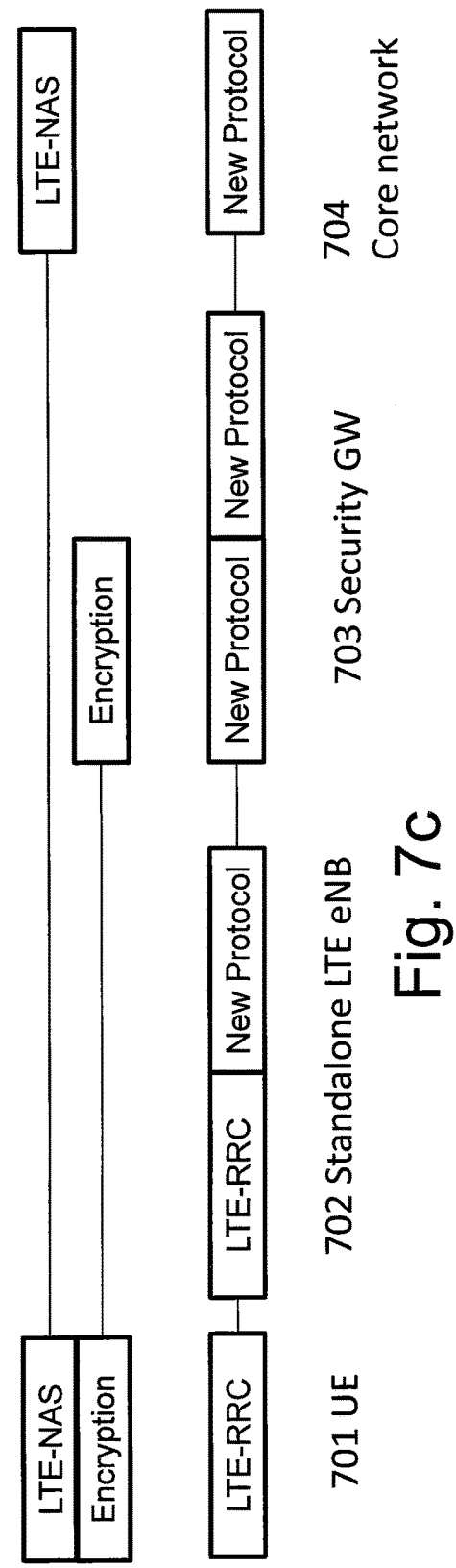

FIGS. 7b and 7c illustrate possible user plane and control plane protocol stacks respectively, assuming that the encryption is terminated in the security GW 703.

C. Smart Network Selection for Service Provision

In addition to selecting a target network according to a subscriber type of the UE, the standalone LTE RAN may also provide smart network selection for providing the requested service to a UE, in order to reduce data-rate cost, improve Quality of Service (QoS) and/or improve security based on the traffic type of the service.

According to embodiments, certain criteria or policies can be predefined to allow selection of an optimal network, in case multiple candidate target networks can provide the requested service for one UE. The following are some examples:

Price based policy: The standalone LTE RAN eNodeB may provide smart network selection for a UE according to the traffic type of the service, to reduce data-rate cost. This may be done via probing, where the cheapest network is selected first. For instance, the standalone LTE RAN eNodeB may check if the backhaul network, which may be a fixed broadband network, can provide the data service. If this is the case, the backhaul network may be selected for the service as it is cheaper than an access to a PLMN network.

QoS based policy: the standalone LTE RAN eNodeB may select a network that can provide best QoS for the UE.

Security based policy: Some services require high security and reliability. The standalone LTE RAN eNodeB may in such cases select a network which best fulfills the security requirements when providing the service.

In embodiments, the UE may report or signal either a list of several candidate target networks or a preferred target network to the standalone LTE RAN eNodeB. An identity of the target network(s) may be included in the request to attach that is transmitted to the standalone LTE RAN eNodeB. Alternatively, the UE does not indicate any target network at all in its request to attach, thus letting the standalone LTE RAN select a target network or propose candidate target networks.

In one example embodiment, the UE sends a request to attach to a standalone LTE RAN eNodeB from which it has received the broadcast message indicating that the eNodeB supports connectivity to a core network associated with another RAN. The UE identifies a preferred target network in the request to attach. The eNodeB may then contact the target core network associated with the identified target network to request information about available types of subscriptions. The identified target network may offer different types of subscriptions—such as time based subscriptions or data based subscriptions—to UEs associated with different types of services such as voice, SMS, or data services. The specified network may also offer different QoS. In response to the request from the eNodeB, the target core network sends the alternative subscription or QoS offers to the eNodeB. Such an offer may be based on the UE and eNodeB involved, and may include payment to the eNodeB provider as well. The eNodeB may then either inform the UE about the offering to allow the UE to select. Alternatively, the eNodeB makes the selection based on pre-determined selection criteria.

In another example embodiment, the UE sends a request to attach to the standalone LTE RAN eNodeB without identifying any target network. The eNodeB may then select a target network and an associated target core network to which the UE may connect. The selection may be either based on information requested and retrieved from candidate target networks or based on pre-defined information.

It is possible that the UE may detect multiple standalone LTE RAN eNodeBs. These may be of different operators or other parties, and may be distinguished based on the standalone LTE RAN eNodeB's broadcast message which may comprise different special PLMN identities as described in section A. The UE may therefore be configured to prioritize certain standalone LTE RAN when selecting which access node to attach to.

Example Embodiment

Figure 3:
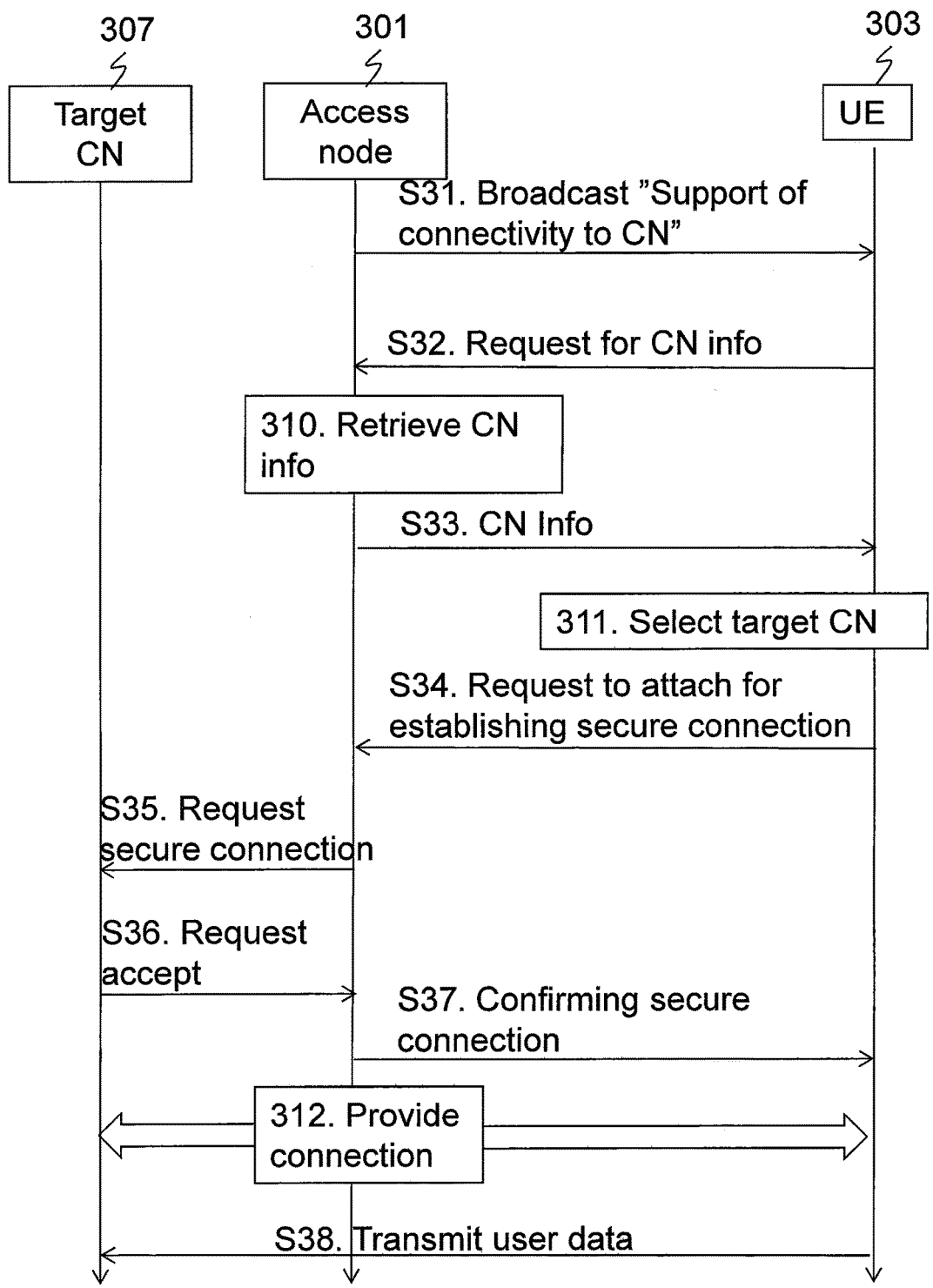
FIG. 3 is a signaling diagram schematically illustrating the signaling between the UE and nodes according to embodiments.

In the following, one example embodiment of a method for enabling an establishment of a connection between a UE 303 and a CN 307 via a standalone LTE RAN eNodeB or access node 301 will be described with reference to the signaling diagram in FIG. 3.

In signal S31 the access node 301 transmits a broadcast message in a cell served by the access node. This broadcast message may be periodically transmitted in the cell. The message indicates that the access node 301 supports connectivity to at least one CN associated with another RAN than the standalone LTE RAN. The broadcast message may e.g. comprise a special PLMN identity which is predefined to indicate that the access node 301 supports connectivity to different CNs, as described in section A above. When the UE 303 detects or receives such a broadcast message, it may in S34 initiate an Attach Request to the access node in analogy with the description in 3GPP TS 23.401 version 12.6.0, section 5.3.2. As part of this request the UE may include its International Mobile Subscriber Identity (IMSI) number uniquely identifying the UE 303. The access node 301 may extract the UE's home PLMN identity from the IMSI. Alternatively the UE may explicitly signal an identity of a desired target PLMN, e.g. the home PLMN.

Before transmitting the request to attach in S34, the UE 301 may in S32 request information related to the CNs to which the access node 301 provides connectivity. This may be done to decide whether there are other candidate target networks to which the UE could connect, e.g. to get a lower cost for the connection or a higher QoS or security, as described above in section C. Smart network selection for service provision. The request for information is directed to the access node 301. The access node 301 will then in 310 retrieve the requested information, e.g. by requesting it from candidate target core networks. In S33 the requested information is transmitted to the UE 303 which may then in 311 select a target core network based on the requested information. The requested information may e.g. comprise different types of subscriptions associated with different types of services offered by the candidate target core networks, or different QoS levels offered by the candidate target core networks. As such subscriptions may be UE specific, the request for information may comprise an identity of the UE.

The request to attach in S34 is transmitted to the access node 301 for initiating an attempt to establish a secure connection for user data between the UE 303 and a target core network 307 via the access node 301. In S35, the access node 301 forwards the UE's request for a secure connection to a target core network 307 such as the UE's home PLMN, e.g. via a security GW of the home PLMN. The core network performs relevant security procedures to verify the UE identity and the UE's intent to use the standalone LTE RAN. This verification may include additional signaling between the UE and the network with the aim to setup the secure connection. As part of this procedure, security keys for user plane transmission may also be established. If the security check at the target core network 307 is successful, an acceptance to the request to establish a secure connection is transmitted to the access node in S36. In S37 a confirmation of the establishment of a secure connection is also forwarded to the UE 303.

Figure 2A:
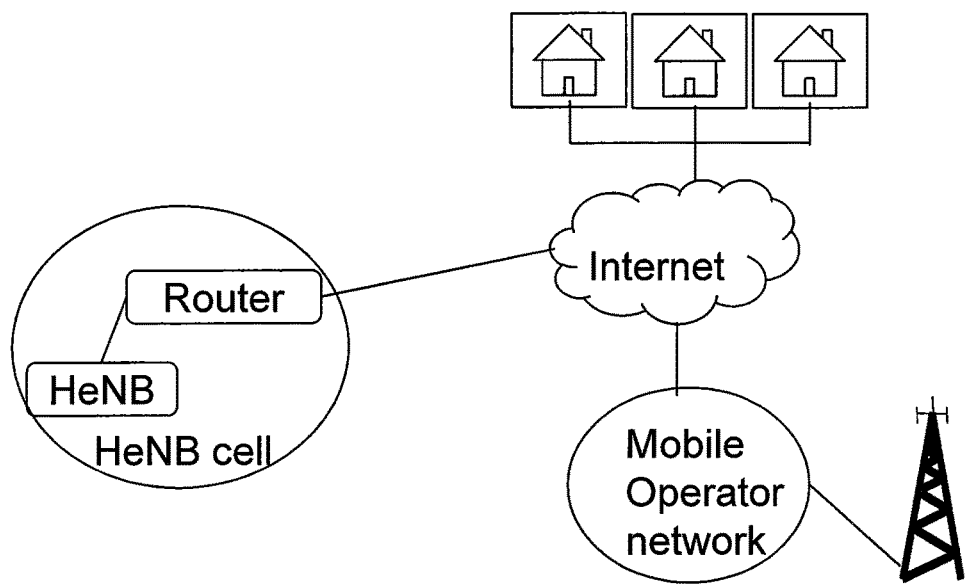
FIG. 2a is a schematic illustration of a typical scenario of a HeNB deployment.
Figure 2B:
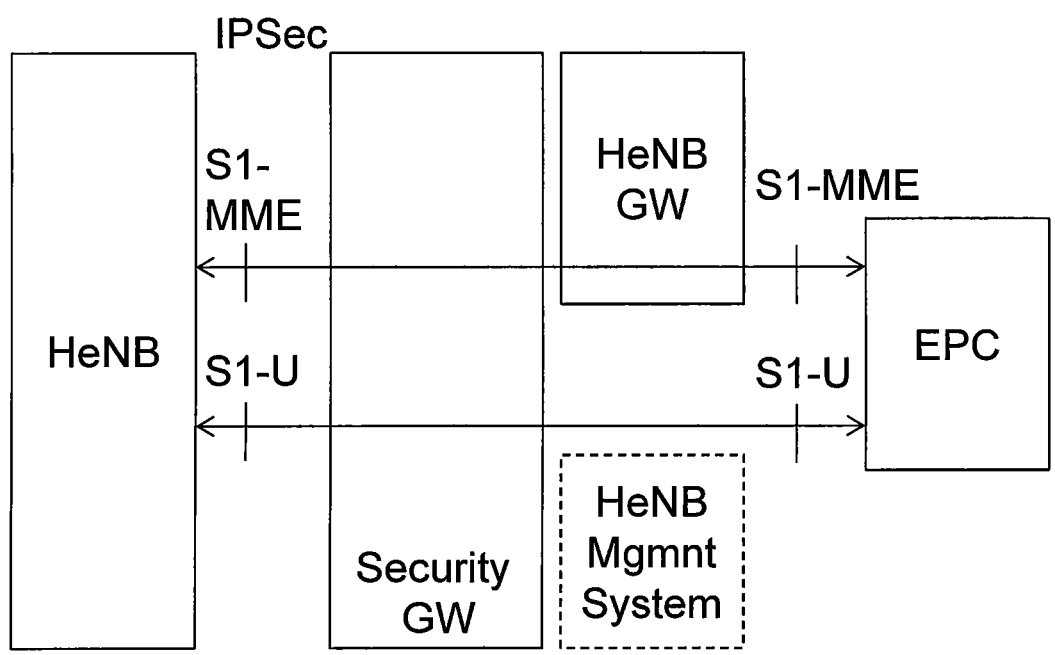
FIG. 2b is a block diagram schematically illustrating an LTE network structure used with the HeNB.

As already mentioned, the access node 301 may contact the target core network via a security GW. The access node may find a proper security GW using a same mechanism as a UE would find an evolved Packet GW (ePDG) as described in 3GPP TS 23.402 version 12.6.0, section 4.5.4. The access node may construct a Fully Qualified Domain Name (FQDN) using the home PLMN identity and employing the DNS server function to obtain the IP address(es) of the ePDG(s). The architecture for such a solution, illustrated in FIG. 7a, becomes very similar to the architecture in FIG. 2. The difference is that the access node 702 is not from the same PLMN as the target network. As a consequence, the access node according to embodiments of the invention sets up one secure tunnel for every UE that sends a request to attach, possibly to different PLMNs, contrary to a HeNB that sets up a single secure tunnel to a single PLMN for all UEs it serves.

In 312, the standalone LTE RAN access node 301 sets up or provides the service connection between the UE 303 and the target core network, as well as configures user plane encryption entities in the target core network and in the UE. If no acceptance is received in S36, the procedure is terminated and no connection is provided.

Finally, in S38 the service's data transmission starts, and the UE 303 may transmit user data to the target core network, or receive user data from the target core network.

Methods

Figure 4A:
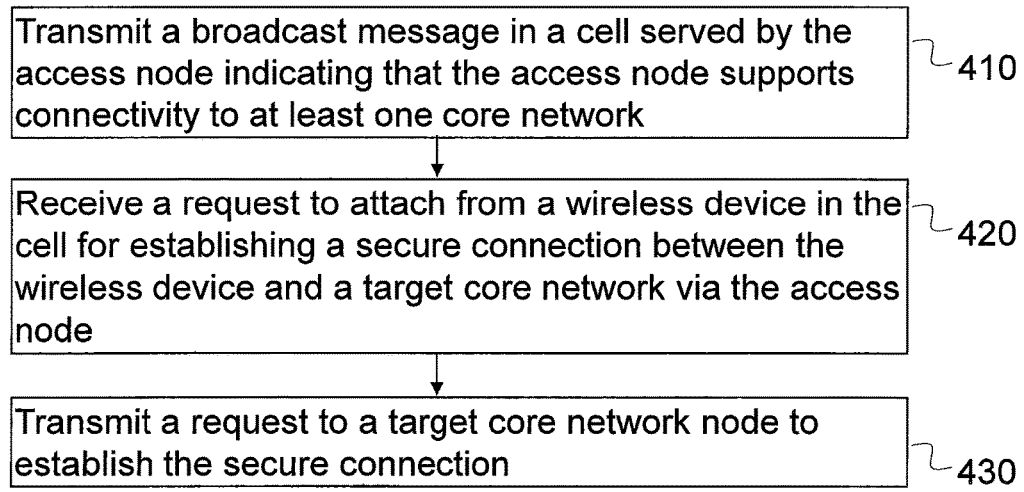
FIGS. 4a-c are flow charts schematically illustrating the method performed by the access node according to embodiments.

FIG. 4a is a flowchart illustrating one embodiment of a method for enabling an establishment of a connection between a wireless device 303 and a core network 307 via an access node 301 of a standalone LTE RAN using an unlicensed frequency band. The method is performed by the access node. The access node may be an eNodeB and the wireless device may be a UE as described in previous embodiments. The method comprises:

- 410: Transmitting a broadcast message in a cell served by the access node, the message indicating that the access node supports connectivity to at least one core network associated with another RAN than the standalone LTE RAN. According to one embodiment, the broadcast message transmitted in the cell served by the access node may comprise a mobile network identity which is pre-defined to indicate that the access node supports connectivity to the at least one core network associated with another RAN than the standalone LTE RAN. As described previously in section A, the mobile network identity may be a special PLMN identity.
- 420: Receiving a request to attach from a wireless device in the cell, for establishing a secure connection for user data between the wireless device and a target core network via the access node.
- 430: Transmitting a request to a target core network node to establish the secure connection. Transmitting the request to the target core network node may comprise determining an IP address of the target core network node using a DNS server function, and using the determined IP address for the transmission of the request.

Figure 4B:
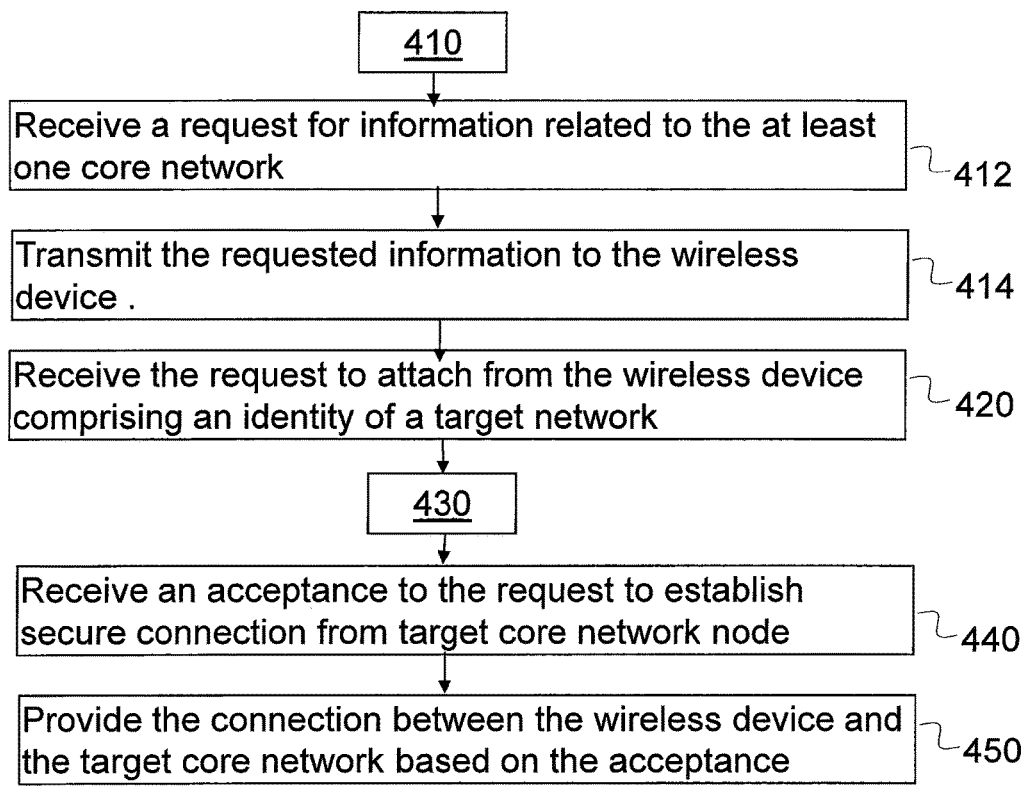

FIG. 4b is a flowchart illustrating another embodiment of the method performed by the access node. The method may comprise the following in addition to the transmitting of the broadcast message as described in step 410 above:

- 412: Receiving a request for information related to the at least one core network to which the access node provides connectivity, wherein the request is received from the wireless device. The wireless device gathers information about the potential target networks to be able to select the best one, which may be based on different criteria.
- 414: Transmitting the requested information to the wireless device for allowing the wireless device to select the target core network based on the requested information. The requested information may comprise at least one of a QoS and a type of subscription provided by the at least one core network. The QoS and the type of subscription may be received from the at least one core network upon request. The access node may thus communicate with the different core networks to retrieve the information requested by the wireless device.
- 420: Receiving the request to attach from the wireless device in the cell, for establishing a secure connection for user data between the wireless device and a target core network via the access node. In this embodiment, the request to attach received from the wireless device comprises an identity of a target network associated with the target core network. The wireless device has thus explicitly included an identity of e.g. a preferred target network in the request. Alternatively, the wireless device may include the identities of more than one potential target network, thus leaving the selection of a network to the access node.
- 430: Transmitting a request to a target core network node to establish the secure connection.
- 440: Receiving an acceptance to the request to establish the secure connection, the acceptance being received from the target core network node.
- 450: Providing the connection between the wireless device and the target core network based on the acceptance. The providing of the connection may in embodiments comprise transmitting an acceptance to the wireless device in response to the request to attach, for confirming that the secure connection for user data has been established.

Figure 4C:
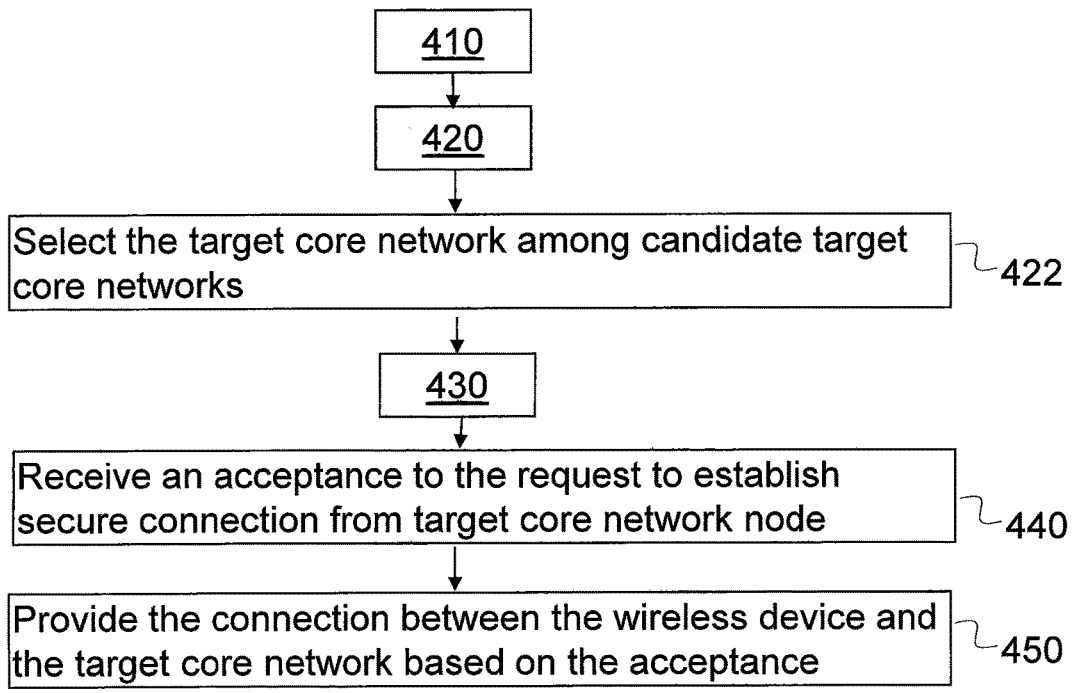

FIG. 4c is a flowchart illustrating an alternative embodiment to the embodiment described with reference to FIG. 4b. The embodiment of the method comprises:

- 410: Transmitting a broadcast message in a cell served by the access node, the message indicating that the access node supports connectivity to at least one core network associated with another RAN than the standalone LTE RAN. According to one embodiment, the broadcast message transmitted in the cell served by the access node may comprise a mobile network identity which is pre-defined to indicate that the access node supports connectivity to the at least one core network associated with another RAN than the standalone LTE RAN. As described previously in section A, the mobile network identity may be a special PLMN identity.
- 420: Receiving a request to attach from a wireless device in the cell, for establishing a secure connection for user data between the wireless device and a target core network via the access node. In this embodiment, the request to attach does not comprise any identity of a preferred target network.
- 422: Selecting the target core network among the at least one core network based on at least one of: a type of subscription of the wireless device; a QoS provided by the at least one core network; a type of subscription provided by the at least one core network. The QoS and the type of subscription may be received from the at least one core network upon request. In this embodiment, the access node has full control of what target core network to select for establishing the connection.

430: Transmitting a request to a target core network node to establish the secure connection.

440: Receiving an acceptance to the request to establish the secure connection, the acceptance being received from the target core network node.

450: Providing the connection between the wireless device and the target core network based on the acceptance. The providing of the connection may in embodiments comprise transmitting an acceptance to the wireless device in response to the request to attach, for confirming that the secure connection for user data has been established.

Figure 5A:
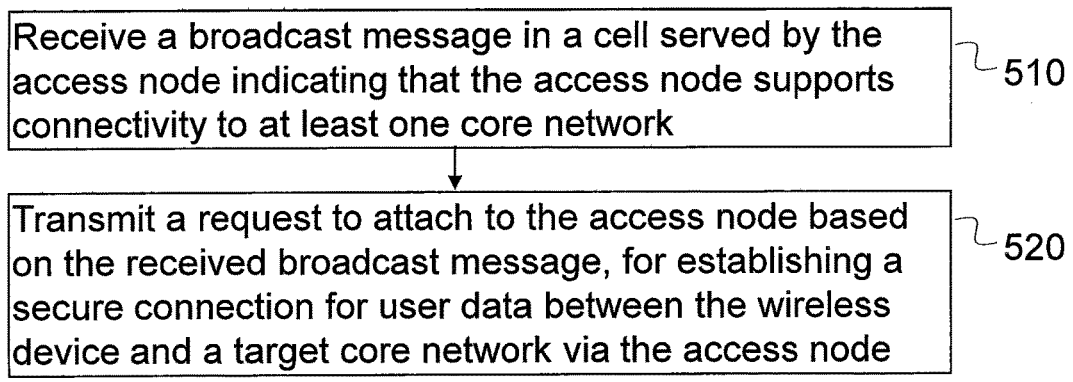
FIGS. 5a-c are flow charts schematically illustrating the method performed by the wireless device according to embodiments.

FIG. 5a is a flowchart illustrating one embodiment of a method for enabling an establishment of a connection between a wireless device 303 and a core network 307 via an access node 301 of a standalone LTE RAN, using an unlicensed frequency band. The method is performed by the wireless device. The method comprises:

510: Receiving a broadcast message in a cell served by the access node, the message indicating that the access node supports connectivity to at least one core network associated with another RAN than the standalone LTE RAN. The broadcast message received in the cell served by the access node may in embodiments comprise a mobile network identity which is pre-defined to indicate that the access node supports connectivity to the at least one core network associated with another RAN than the standalone LTE RAN. As described previously in section A, the mobile network identity may be a special PLMN identity.

520: Transmitting a request to attach to the access node based on the received broadcast message, for establishing a secure connection for user data between the wireless device and a target core network via the access node. The request to attach transmitted to the access node may comprise an identity of a target network associated with the target core network.

Figure 5B:
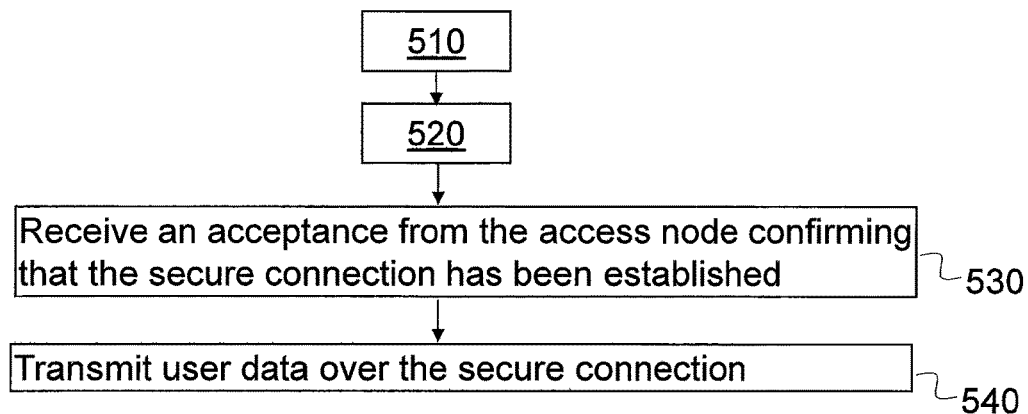

FIG. 5b is a flowchart illustrating another embodiment of the method performed by the wireless device. The method may optionally comprise the following in addition to the receiving of the broadcast message and the transmitting of the request to attach as described in step 510 and 520 above:

530: Receiving an acceptance in response to the request to attach from the access node, confirming that the secure connection for user data has been established.

540: Transmitting user data over the secure connection. As described previously with reference to FIG. 7a the secure connection may be a secure tunnel established between the UE and the target core network.

Figure 5C:
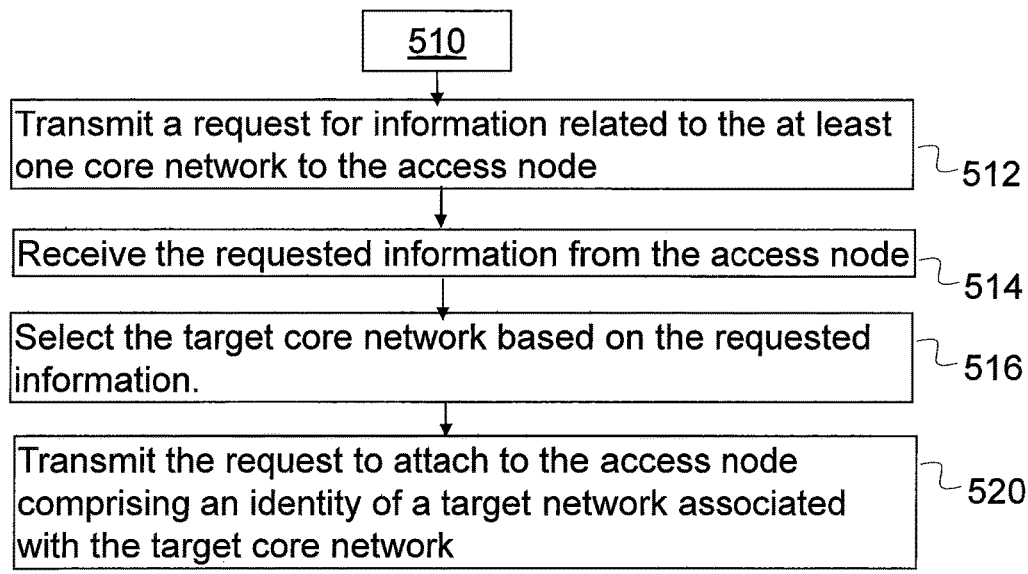

FIG. 5c is a flowchart illustrating an embodiment performed by the wireless device that may be combined with the embodiment described with reference to FIG. 5b. The embodiment of the method comprises:

510: Receiving a broadcast message in a cell served by the access node, the message indicating that the access node supports connectivity to at least one core network associated with another RAN than the standalone LTE RAN. The broadcast message received in the cell served by the access node may in embodiments comprise a mobile network identity which is pre-defined to indicate that the access node supports connectivity to the at least one core network associated with another RAN than the standalone LTE RAN. As described previously in section A, the mobile network identity may be a special PLMN identity.

512: Transmitting a request to the access node for information related to the at least one core network to which the access node provides connectivity. The UE here request more information needed to make a decision regarding what target network to connect to.

514: Receiving the requested information from the access node. The requested information may comprise at least one of a QoS and a type of subscription provided by the at least one core network. A target core network providing a higher QoS may e.g. be preferred for the UE in some scenarios.

516: Selecting a target core network based on the requested information.

520: Transmitting the request to attach to the access node based on the received broadcast message, for establishing a secure connection for user data between the wireless device and a target core network via the access node.

Apparatus

Figure 6A:
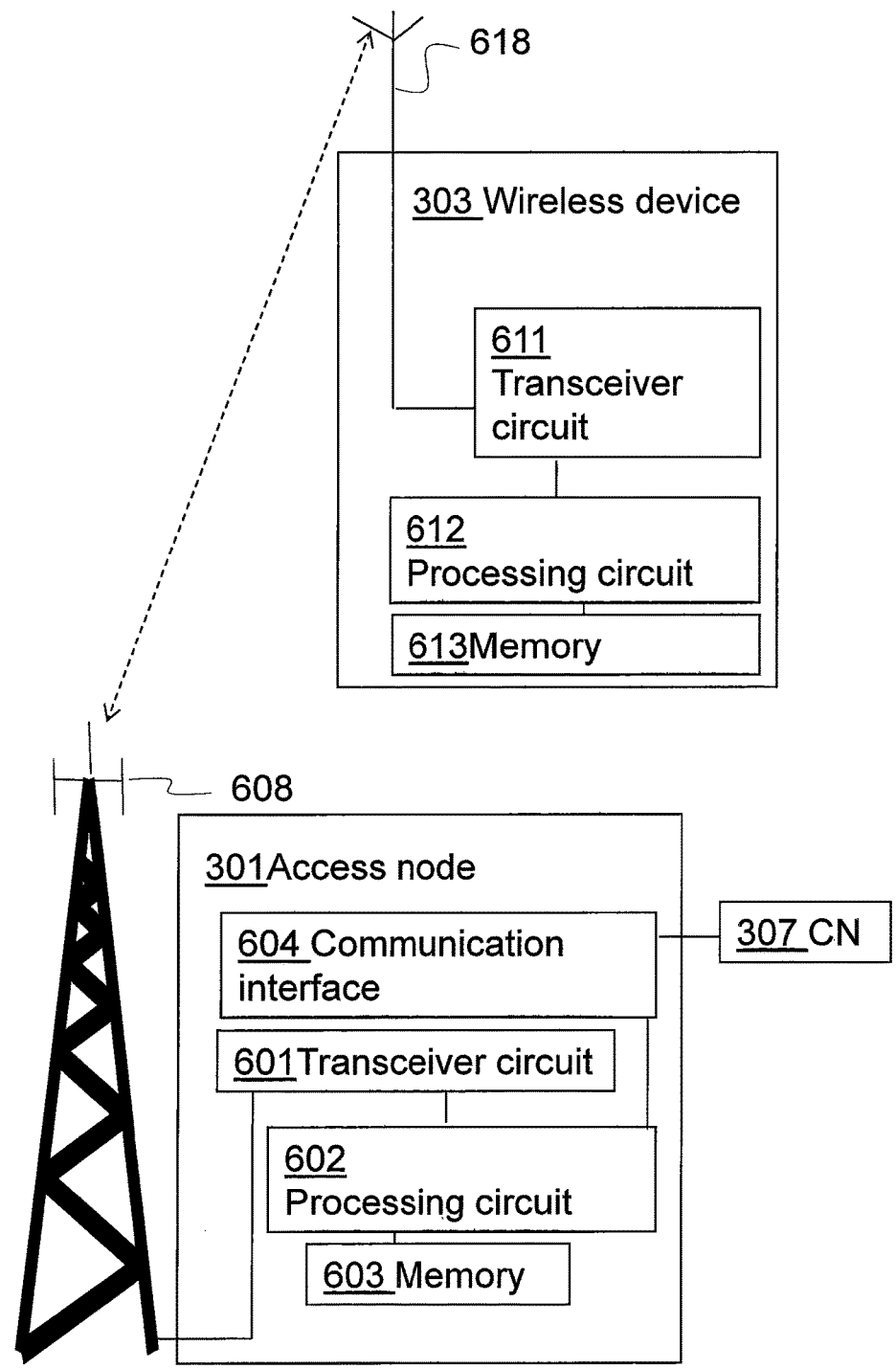
FIGS. 6a-b are block diagrams schematically illustrating the access node, the wireless device and the core networks according to embodiments.

An embodiment of a wireless device 303 and an access node 301 of a standalone LTE RAN using an unlicensed frequency band is schematically illustrated in the block diagram in FIG. 6a.

The access node 301 is configured to enable an establishment of a connection between the wireless device 303 and a core network 307 via the access node. The access node is further configured to transmit a broadcast message in a cell served by the access node, the message indicating that the access node supports connectivity to at least one core network associated with another RAN than the standalone LTE RAN. The broadcast message transmitted in the cell served by the access node may comprise a mobile network identity which is pre-defined to indicate that the access node supports connectivity to the at least one core network associated with another RAN than the standalone LTE RAN. The access node is also configured to receive a request to attach from a wireless device in the cell, for establishing a secure connection for user data between the wireless device and a target core network via the access node, and transmit a request to a target core network node to establish the secure connection. In embodiments, the access node may be configured to receive the request to attach comprising an identity of a target network associated with the target core network. Furthermore, the access node may be configured to transmit the request to the target core network node by determining an IP address of the target core network node using a DNS server function, and using the determined IP address for the transmission of the request.

In embodiments, the access node 301 may be further configured to receive an acceptance to the request to establish the secure connection, the acceptance being received from the target core network node, and provide the connection between the wireless device and the target core network based on the acceptance. The access node 301 may be configured to provide the connection by transmitting an acceptance to the wireless device in response to the request to attach, for confirming that the secure connection for user data has been established.

In another embodiment, the access node 301 may be configured to, before receiving the request to attach, receive a request for information related to the at least one core network to which the access node provides connectivity, wherein the request is received from the wireless device. Furthermore, the access node may be configured to transmit the requested information to the wireless device for allowing the wireless device to select the target network based on the requested information, the requested information comprising at least one of a quality of service and a type of subscription provided by the at least one core network.

In embodiments, the request to attach may not comprise an identity of a target network associated with the target core network, and the access node 301 may be further configured to select the target core network among the at least one core network based on at least one of: a type of subscription of the wireless device; a quality of service provided by the at least one core network; a type of subscription provided by the at least one core network.

The access node 301 may be configured to receive the quality of service and the type of subscription from the at least one core network upon request.

The wireless device 303 in FIG. 6a is configured to enable an establishment of a connection between the wireless device and a core network 307 via the access node 301 of the standalone LTE RAN using an unlicensed frequency band. The wireless device is further configured to receive the broadcast message in a cell served by the access node, the message indicating that the access node supports connectivity to at least one core network associated with another RAN than the standalone LTE RAN. The broadcast message received in the cell served by the access node may comprise a mobile network identity which is pre-defined to indicate that the access node supports connectivity to the at least one core network associated with another RAN than the standalone LTE RAN. The wireless device is also configured to transmit a request to attach to the access node based on the received broadcast message, for establishing a secure connection for user data between the wireless device and a target core network via the access node. The wireless device 303 may be configured to transmit the request to attach to the access node comprising an identity of a target network associated with the target core network.

In embodiments, the wireless device 303 may be further configured to receive an acceptance in response to the request to attach from the access node, confirming that the secure connection for user data has been established, and transmit user data over the secure connection.

In another embodiment, the wireless device 303 may be further configured to transmit a request for information related to the at least one core network to which the access node provides connectivity, wherein the request is transmitted to the access node. The requested information may comprise at least one of a quality of service and a type of subscription provided by the at least one core network. The wireless device 303 may be further configured to receive the requested information from the access node, and select the target core network based on the requested information.

In embodiments of the invention, the access node 301 comprises a transceiver circuit 601 configured to communicate with the wireless device 303, a processing circuit 602, and a memory 603 storing instructions that, when executed by the processing circuit, cause the access node to transmit via the transceiver circuit a broadcast message in a cell served by the access node, the message indicating that the access node supports connectivity to at least one core network associated with another RAN than the standalone LTE RAN. Furthermore, the instructions when executed by the processing circuit cause the access node to receive via the transceiver circuit a request to attach from a wireless device in the cell, for establishing a secure connection for user data between the wireless device and a target core network via the access node, and transmit via the transceiver circuit a request to a target core network node to establish the secure connection. One or more antennas 608 may be connected to the transceiver circuit 601. Furthermore, the access node may comprise a communication interface allowing the communication with the at least one CN 307.

In embodiments of the invention, the wireless device 303 comprises a transceiver circuit 611 configured to communicate with the access node 301, a processing circuit 612, and a memory 613 storing instructions that, when executed by the processing circuit, cause the wireless device to receive via the transceiver circuit a broadcast message in a cell served by the access node, the message indicating that the access node supports connectivity to at least one core network associated with another RAN than the standalone LTE RAN. Furthermore, it causes the wireless device to transmit via the transceiver circuit a request to attach to the access node based on the received broadcast message, for establishing a secure connection for user data between the wireless device and a target core network via the access node. One or more antennas 618 may be connected to the transceiver circuit 611.

The processing circuits described above may comprise a Central Processing Unit (CPU) which may be a single unit or a plurality of units. Furthermore, the memories in the access node and the wireless device may be non-volatile memories, e.g. an EEPROM (Electrically Erasable Programmable Read-Only Memory), a flash memory or a disk drive. The memory may correspond to a computer program product (CPP) comprising a computer program. The computer program comprises code means which when run on the wireless device and the access node respectively causes the CPU to perform steps of the procedure described earlier.

Figure 6B:
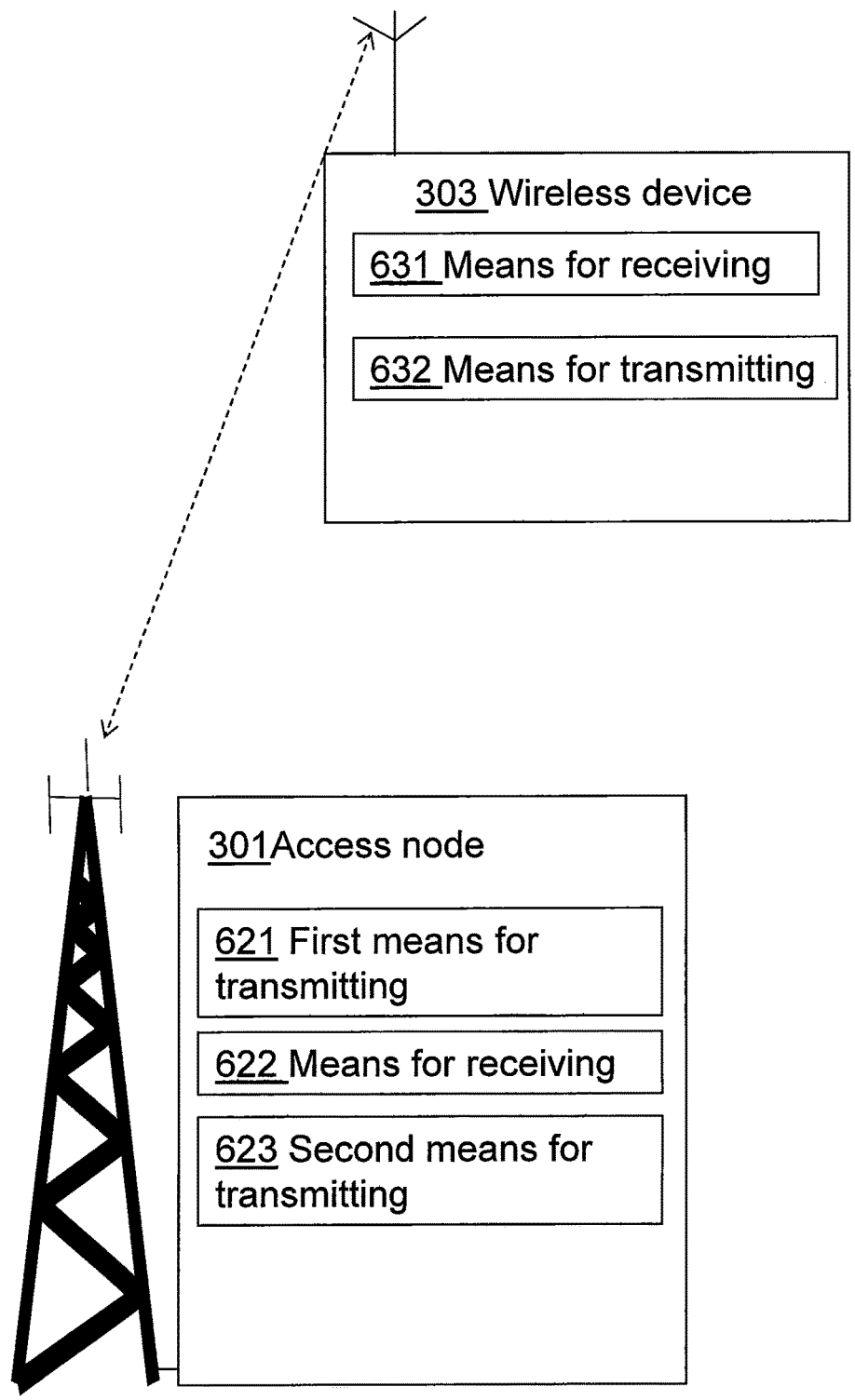

In an alternative way to describe the embodiment in FIG. 6a, illustrated in FIG. 6b, the access node 301 comprises a first means for transmitting 621 the broadcast message in the cell served by the access node. The access node 301 also comprises means for receiving 622 the request to attach from a wireless device in the cell. The access node 301 further comprises a second means for transmitting 623 the request to a target core network node to establish the secure connection. The wireless device 303 comprises means for receiving 631 the broadcast message in the cell served by the access node, and means for transmitting 632 the request to attach to the access node based on the received broadcast message. The means described above are functional means which may be implemented in hardware, software, firmware or any combination thereof. In one embodiment, the means are implemented as a computer program running on a processor.

The above mentioned and described embodiments are only given as examples and should not be limiting. Other solutions, uses, objectives, and functions within the scope of the accompanying patent claims may be possible.

The invention claimed is:

1. A method for enabling an establishment of a connection between a wireless device and a core network via an access node of a standalone Long Term Evolution, LTE, radio access network, using an unlicensed frequency band, the method being performed by the access node and comprising:
   transmitting a broadcast message in a cell served by the access node, the broadcast message indicating that the access node supports connectivity to at least one core network associated with another RAN than the standalone LTE RAN,
   receiving a request for information related to the at least one core network to which the access node provides connectivity, wherein the request is received from the wireless device,
   transmitting the information that was requested to the wireless device for allowing the wireless device to select the target core network based on the information, wherein the information comprises at least one of a quality of service or a type of subscription provided by the at least one core network, receiving a request to attach, from a wireless device in the cell, for establishing a secure connection for user data between the wireless device and a target core network via the access node, wherein the request to attach received from the wireless device comprises an identity of a target network associated with the target core network, and transmitting a request to a target core network node to establish the secure connection.

2. The method according to claim 1, further comprising:
receiving an acceptance to the request to establish the secure connection, the acceptance being received from the target core network node, and
providing the connection between the wireless device and the target core network based on the acceptance.

3. The method according to claim 2, wherein providing the connection comprises transmitting an acceptance to the wireless device in response to the request to attach, for confirming that the secure connection for user data has been established.

4. The method according to claim 1, further comprising:
selecting the target core network among the at least one core network based on at least one of: a type of subscription of the wireless device; a quality of service provided by the at least one core network; a type of subscription provided by the at least one core network.

5. The method according to claim 1, wherein the quality of service and the type of subscription is received from the at least one core network upon request.

6. The method according claim 1, wherein transmitting the request to the target core network node comprises:
determining an Internet Protocol (IP) address of the target core network node using a Domain Name System (DNS) server function, and
using the determined IP address for the transmission of the request.

7. The method according to claim 1, wherein the broadcast message transmitted in the cell served by the access node comprises a mobile network identity which is pre-defined to indicate that the access node supports connectivity to the at least one core network associated with another RAN than the standalone LTE RAN.

8. A method for enabling an establishment of a connection between a wireless device and a core network via an access node of a standalone Long Term Evolution, (LTE), Radio Access Network (RAN) using an unlicensed frequency band, the method being performed by the wireless device and comprising:
receiving a broadcast message in a cell served by the access node, the broadcast message indicating that the access node supports connectivity to at least one core network associated with another RAN than the standalone LTE RAN,
transmitting a request for information related to the at least one core network to which the access node provides connectivity, wherein the request for information is transmitted to the access node, the request for information comprising at least one of a quality of service or a type of subscription provided by the at least one core network,
receiving the information that was requested from the access node,
selecting the target core network based on the information that was received, and
transmitting a request to attach to the access node based on the received broadcast message received, for establishing a secure connection for user data between the wireless device and a target core network via the access node, wherein the request to attach comprises an identity of a target network associated with the target core network.

9. The method according to claim 8, further comprising:
receiving an acceptance in response to the request to attach from the access node, confirming that the secure connection for user data has been established, and
transmitting user data over the secure connection.

10. The method according to claim 8, wherein the broadcast message received in the cell served by the access node comprises a mobile network identity which is pre-defined to indicate that the access node supports connectivity to the at least one core network associated with another RAN than the standalone LTE RAN.

11. An access node of a standalone Long Term Evolution (LTE), Radio Access Network (RAN) using an unlicensed frequency band, the access node being configured to enable an establishment of a connection between a wireless device and a core network via the access node, the access node comprising:
a transceiver configured to provide radio communications with the wireless device of the LTE RAN;
a memory;
a processor coupled to the memory and the transceiver, wherein the processor is configured to perform operations comprising:
transmitting a broadcast message in a cell served by the access node, the message indicating that the access node supports connectivity to at least one core network associated with another RAN than the standalone LTE RAN,
receiving a request for information related to the at least one core network to which the access node provides connectivity, wherein the request is received from the wireless device,
transmitting the information that was requested to the wireless device for allowing the wireless device to select the target core network based on the information, wherein the information comprises at least one of a quality of service or a type of subscription provided by the at least one core network,
receiving a request to attach from a wireless device in the cell, for establishing a secure connection for user data between the wireless device and a target core network via the access node, wherein the request to attach received from the wireless device comprises an identity of a target network associated with the target core network, and
transmitting a request to a target core network node to establish the secure connection.

12. The access node according to claim 11, wherein the processor is further configured to perform operations comprising:
receiving an acceptance to the request to establish the secure connection, the acceptance being received from the target core network node, and
providing the connection between the wireless device and the target core network based on the acceptance.

13. The access node according to claim 12, wherein the processor is further configured to perform operations comprising:

providing the connection by transmitting an acceptance to the wireless device in response to the request to attach, for confirming that the secure connection for user data has been established.

14. The access node according to claim 11, wherein the processor is further configured to perform operations comprising:
selecting the target core network among the at least one core network based on at least one of: a type of subscription of the wireless device; a quality of service provided by the at least one core network; a type of subscription provided by the at least one core network.

15. The access node according to claim 11, wherein the processor is further configured to perform operations comprising:
receiving the quality of service and the type of subscription from the at least one core network upon request.

16. The access node according to claim 11, wherein the processor is configured to transmit the request to the target core network node by performing operations comprising:
determining an Internet Protocol (IP) address of the target core network node using a Domain Name System (DNS) server function, and
using the determined IP address for the transmission of the request.

17. The access node according to claim 11, wherein the broadcast message transmitted in the cell served by the access node comprises a mobile network identity which is pre-defined to indicate that the access node supports connectivity to the at least one core network associated with another RAN than the standalone LTE RAN.

18. A wireless device configured to enable an establishment of a connection between the wireless device and a core network via an access node of a standalone Long Term Evolution (LTE), Radio Access Network (RAN) using an unlicensed frequency band, the wireless device comprising:
a transceiver configured to provide radio communications with the wireless device of the LTE RAN;
a memory;
a processor coupled to the memory and the transceiver, wherein the processor is configured to perform operations comprising:
receiving a broadcast message in a cell served by the access node, the message indicating that the access node supports connectivity to at least one core network associated with another RAN than the standalone LTE RAN,
transmitting a request for information related to the at least one core network to which the access node provides connectivity, wherein the request for information is transmitted to the access node, the request for information comprising at least one of a quality of service or a type of subscription provided by the at least one core network,
receiving the information that was requested from the access node,
selecting the target core network based on the information that was received, and
transmitting a request to attach to the access node based on the broadcast message received, for establishing a secure connection for user data between the wireless device and a target core network via the access node, wherein the request to attach comprises an identity of a target network associated with the target core network.

19. The wireless device according to claim 18, wherein the processor is further configured to perform operations comprising:
receiving an acceptance in response to the request to attach from the access node, confirming that the secure connection for user data has been established, and
transmitting user data over the secure connection.

20. The wireless device according to claim 18, wherein the broadcast message received in the cell served by the access node comprises a mobile network identity which is pre-defined to indicate that the access node supports connectivity to the at least one core network associated with another RAN than the standalone LTE RAN.

21. An access node of a standalone Long Term Evolution, (LTE), Radio Access Network (RAN) using an unlicensed frequency band, the access node being configured to enable an establishment of a connection between a wireless device and a core network via the access node, the access node comprising a transceiver circuit, a processing circuit, and a memory storing instructions that, when executed by the processing circuit, cause the access node to perform operations comprising:
transmitting via the transceiver circuit a broadcast message in a cell served by the access node, the message indicating that the access node supports connectivity to at least one core network associated with another RAN than the standalone LTE RAN,
receiving via the transceiver circuit a request for information related to the at least one core network to which the access node provides connectivity, wherein the request is received from the wireless device,
transmitting via the transceiver circuit the information that was requested to the wireless device for allowing the wireless device to select the target core network based on the information, wherein the information comprises at least one of a quality of service or a type of subscription provided by the at least one core network,
receiving via the transceiver circuit a request to attach from a wireless device in the cell, for establishing a secure connection for user data between the wireless device and a target core network via the access node, wherein the request to attach received from the wireless device comprises an identity of a target network associated with the target core network, and
transmitting via the transceiver circuit a request to a target core network node to establish the secure connection.

22. A wireless device configured to enable an establishment of a connection between the wireless device and a core network via an access node of a standalone Long Term Evolution, (LTE), Radio Access Network (RAN) using an unlicensed frequency band, the wireless device comprising a transceiver circuit, a processing circuit, and a memory storing instructions that, when executed by the processing circuit, cause the access node to perform operations comprising:
receiving via the transceiver circuit a broadcast message in a cell served by the access node, the broadcast message indicating that the access node supports connectivity to at least one core network associated with another RAN than the standalone LTE RAN,
transmitting via the transceiver circuit a request for information related to the at least one core network to which the access node provides connectivity, wherein the request for information is transmitted to the access node, the request for information comprising at least one of a quality of service or a type of subscription provided by the at least one core network, receiving via the transceiver circuit the information that was requested from the access node, selecting the target core network based on the information that was received, and transmitting via the transceiver circuit a request to attach to the access node based on the received broadcast message received, for establishing a secure connection for user data between the wireless device and a target core network via the access node.

* * * * *